(12) United States Patent
Gopalarathnam et al.

(10) Patent No.: US 11,277,357 B2
(45) Date of Patent: Mar. 15, 2022

(54) MULTI-PORT QUEUE GROUP SYSTEM

(71) Applicant: Dell Products L.P., Round Rock, TX (US)

(72) Inventors: Sudharsan Dhamal Gopalarathnam, Tamil Nadu (IN); Aravind Babu Mahendrababu, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/257,648

(22) Filed: Jan. 25, 2019

(65) Prior Publication Data

US 2020/0244601 A1 Jul. 30, 2020

(51) Int. Cl.

| | |
|---|---|
| *H04L 12/861* | (2013.01) |
| *H04L 12/935* | (2013.01) |
| *H04L 12/24* | (2006.01) |
| *H04L 12/947* | (2013.01) |
| *H04L 12/709* | (2013.01) |
| *H04L 12/863* | (2013.01) |
| *H04L 49/9047* | (2022.01) |
| *H04L 49/00* | (2022.01) |
| *H04L 41/0806* | (2022.01) |
| *H04L 49/25* | (2022.01) |
| *H04L 45/24* | (2022.01) |
| *H04L 47/6295* | (2022.01) |

(52) U.S. Cl.
CPC ...... *H04L 49/9047* (2013.01); *H04L 41/0806* (2013.01); *H04L 45/245* (2013.01); *H04L 47/6295* (2013.01); *H04L 49/258* (2013.01); *H04L 49/3027* (2013.01)

(58) Field of Classification Search
CPC . H04L 49/907; H04L 41/0806; H04L 45/245; H04L 47/6295; H04L 49/258; H04L 49/3027
See application file for complete search history.

(56) References Cited

U.S. PATENT DOCUMENTS

| | | | |
|---|---|---|---|
| 8,792,497 B2* | 7/2014 | Rajagopalan | H04L 45/245 370/395.3 |
| 9,100,313 B1* | 8/2015 | Mazzola | H04L 49/25 |
| 9,806,993 B1* | 10/2017 | Mandal | H04L 45/745 |
| 10,044,646 B1* | 8/2018 | Detwiler | H04L 49/90 |
| 10,412,018 B1* | 9/2019 | Feng | H04L 49/1546 |
| 2010/0014428 A1* | 1/2010 | Naven | H04L 49/3045 370/237 |

(Continued)

*Primary Examiner* — Harry H Kim
*Assistant Examiner* — Mohammed M Murshid
(74) *Attorney, Agent, or Firm* — Joseph Mencher (57) ABSTRACT

A multi-port queue group system an Network Processing Unit coupled to ingress port(s) and an egress port group having a first egress port and a second egress port. The NPU includes an egress queue group having a first egress queue associated with the first egress port and a second egress queue associated with the second egress port. The NPU receives data packets that are each directed to the egress port group via the ingress port(s), and buffers a first subset of the data packets in the first egress queue included in the egress queue group, and a second subset of the data packets in the second egress queue included in the egress queue group. The NPU then transmits at least one of the data packets via at least one of the first egress port and the second egress port included in the egress port group.

17 Claims, 9 Drawing Sheets

(56) References Cited

U.S. PATENT DOCUMENTS

2013/0329577 A1* 12/2013 Suzuki ................. H04L 49/552
                                                                370/252
2016/0226797 A1*  8/2016 Aravinthan ........... H04L 49/251
2016/0301618 A1* 10/2016 Labonte .............. H04L 49/3045
2020/0153739 A1*  5/2020 Gafni ...................... H04L 47/41

* cited by examiner

MULTI-PORT QUEUE GROUP SYSTEM

BACKGROUND

The present disclosure relates generally to information handling systems, and more particularly to grouping queues associated with multiple ports on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, may utilize queues to buffer packets transmitted by those networking devices. For example, switch devices may receive data packets via ingress ports on the switch device, buffer those data packets in egress queues associated with egress ports on the switch device, and then transmit those buffered data packets via those egress ports. The buffering of data packets using queues associated with an egress port can raise a number of issues. For example, buffer-related configurations such as queue minimum buffer size configurations, queue shared buffer size configurations, and/or other buffer-related configurations known in the art, are conventionally applied on a per-queue, per-port basis (e.g., the buffer-related configurations apply to a particular queue associated with a particular port). However, ports on a switch device can be configured in Link Aggregation Groups (LAGs) or provided in a variety of multi-path scenarios (e.g., via the Equal Cost Multi-path Protocol (ECMP)) where the restriction of buffer-related configurations to per-queue, per-port is inefficient, and can overload the queue associated with a single port included in the LAG (or provided in the multi-path scenario) while queue resources are available in other ports included in the LAG (or provided in the multi-path scenario).

Accordingly, it would be desirable to provide an improved port queue system.

SUMMARY

According to one embodiment, an Information Handling System (IHS) includes a processing system; and a memory system that is coupled to the processing system and that includes instruction that, when executed by the processing system, cause the processing system to perform operations including: providing a queue group including: a first queue associated with a first port that is included in a port group; and a second queue associated with a second port that is included in the port group; receiving a plurality of data packets; determining that each of the plurality of data packets are directed to the port group; buffering a first subset of the plurality of data packets in the first queue included in the queue group; buffering a second subset of the plurality of data packets in the second queue included in the queue group; and transmitting at least one of the plurality of data packets via at least one of the first port and the second port included in the port group.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
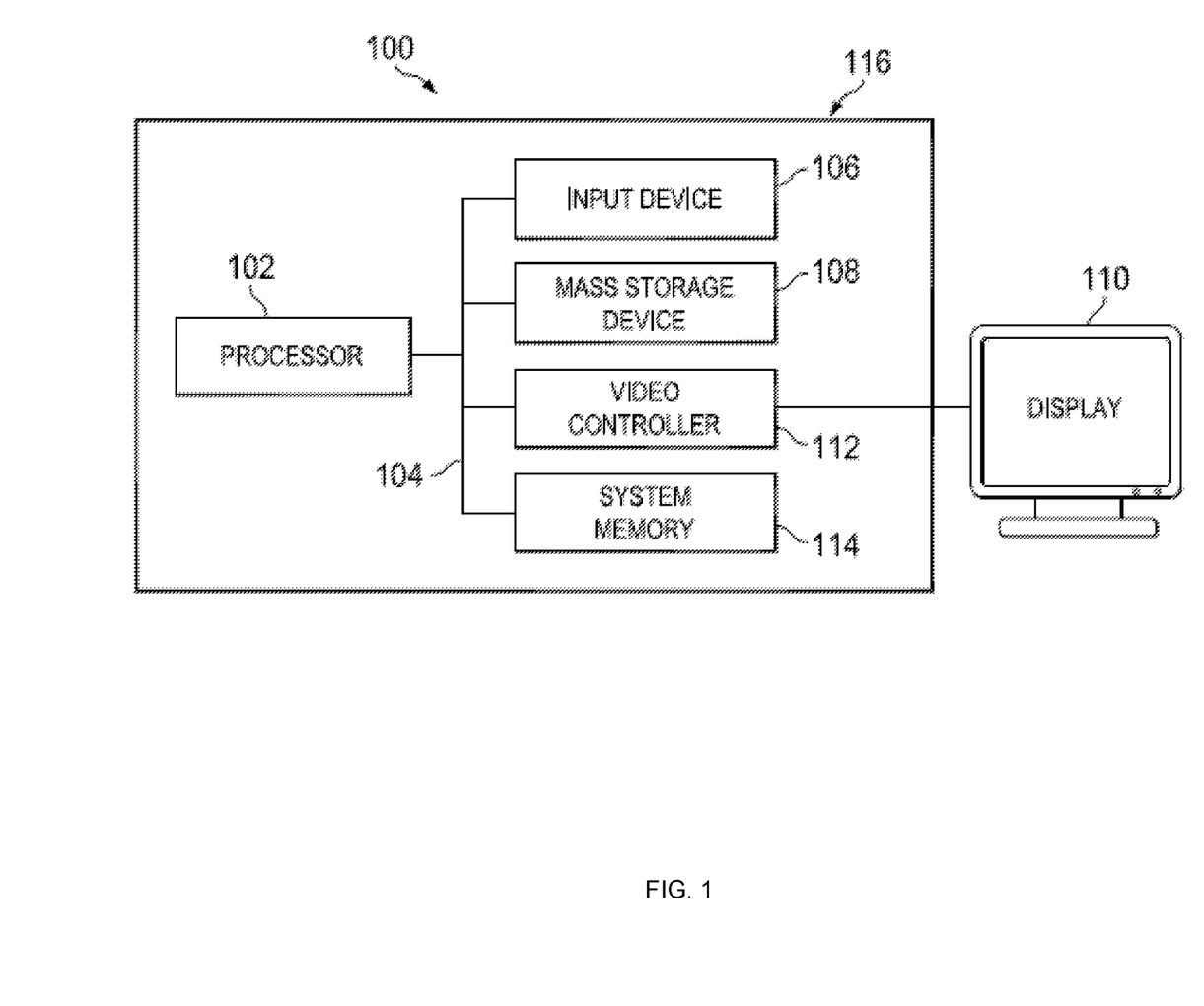
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
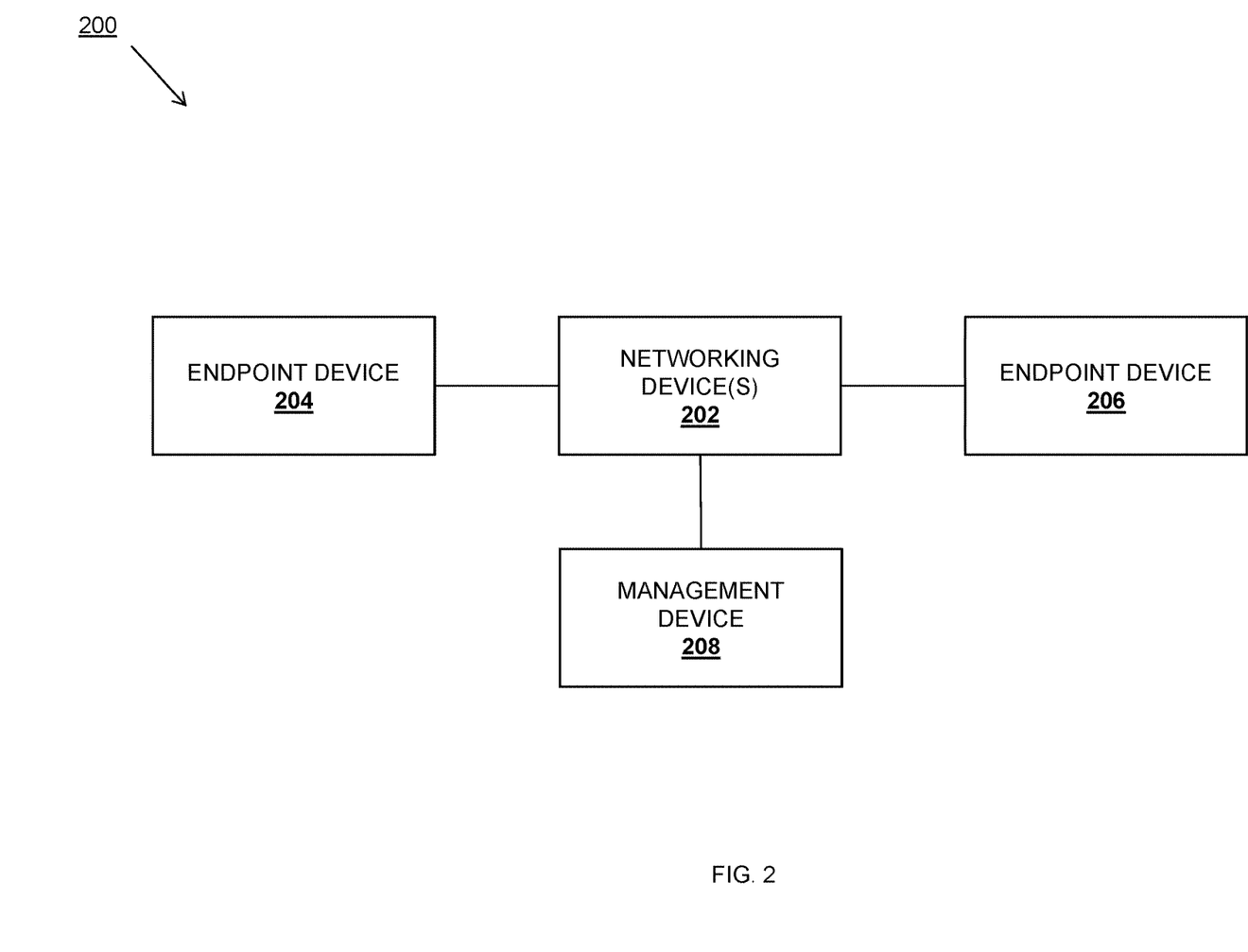
FIG. 2 is a schematic view illustrating an embodiment of a networked system.

Referring now to FIG. 2, an embodiment of a networked system 200 is illustrated. In the illustrated embodiment, the networked system 200 includes one or more networking devices 202, any or all of which may be provided by the IHS 100 discussed above with reference to FIG. 1, and/or may include some or all of the components of the IHS 100. In the examples provided below, the networking device(s) 202 are described as switch devices, although one of skill in art in possession of the present disclosure will recognize that router device(s) and/or other networking devices, as well as any other device utilizing port groups and data packet buffering/queuing, will benefit from the teachings of the present disclosure and thus are envisioned as falling within its scope as well. In the illustrated embodiment, the networking device(s) 202 are coupled to an endpoint device 204 and an endpoint device 206, either or both of which may be provided by the IHS 100 discussed above with reference to FIG. 1, and/or may include some or all of the components of the IHS 100. For example, the endpoint device 204 may be provided by a server device, and the endpoint device 206 may be provided by a user device such as a desktop computing device, a laptop/notebook computing device, a tablet computing device, a mobile phone, and/or other user devices that would be apparent to one of skill in the art in possession of the present disclosure. However, any endpoint devices that transmit data packets to each other via networking device are envisioned as falling within the scope of the present disclosure as well. In the illustrated embodiment, the networking device(s) 202 may be coupled to a management device 208, which may be provided by the IHS 100 discussed above with reference to FIG. 1, and/or may include some or all of the components of the IHS 100. For example, the management device 208 may be provided by a desktop computing device, a laptop/notebook computing device, a tablet computing device, a mobile phone, and/or other management devices that would be apparent to one of skill in the art in possession of the present disclosure. While a specific networked system 200 is illustrated and described herein for the purposes of providing the examples below, one of skill in the art in possession of the present disclosure will recognize that networked systems may include a variety of components and/or component configurations that will fall within the scope of the present disclosure as well.

Figure 3A:
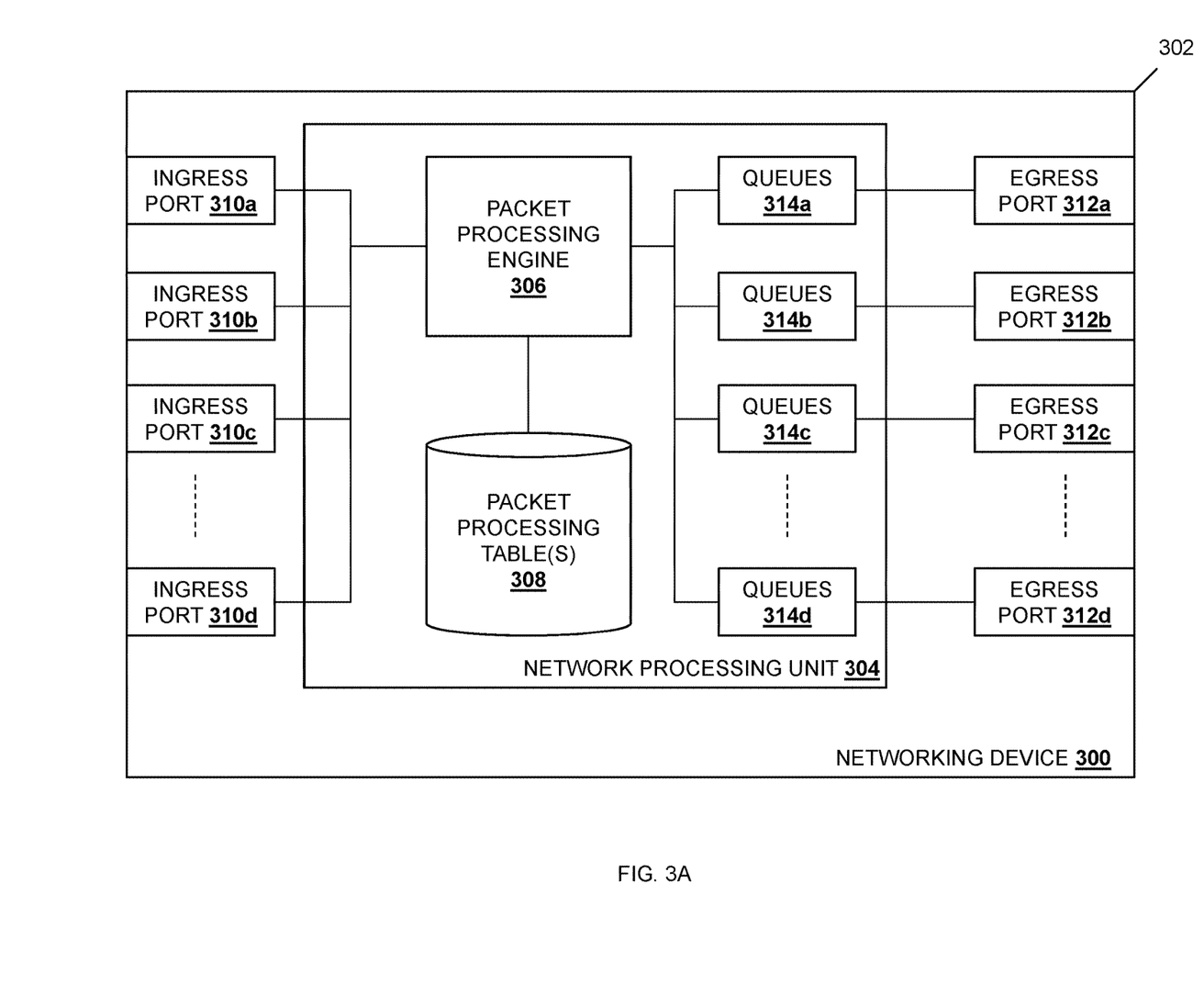
FIG. 3A is a schematic view illustrating an embodiment of a networking device that may be included in the networking system of FIG. 2 and that may provide the multi-port queue group system of the present disclosure.
Figure 3B:
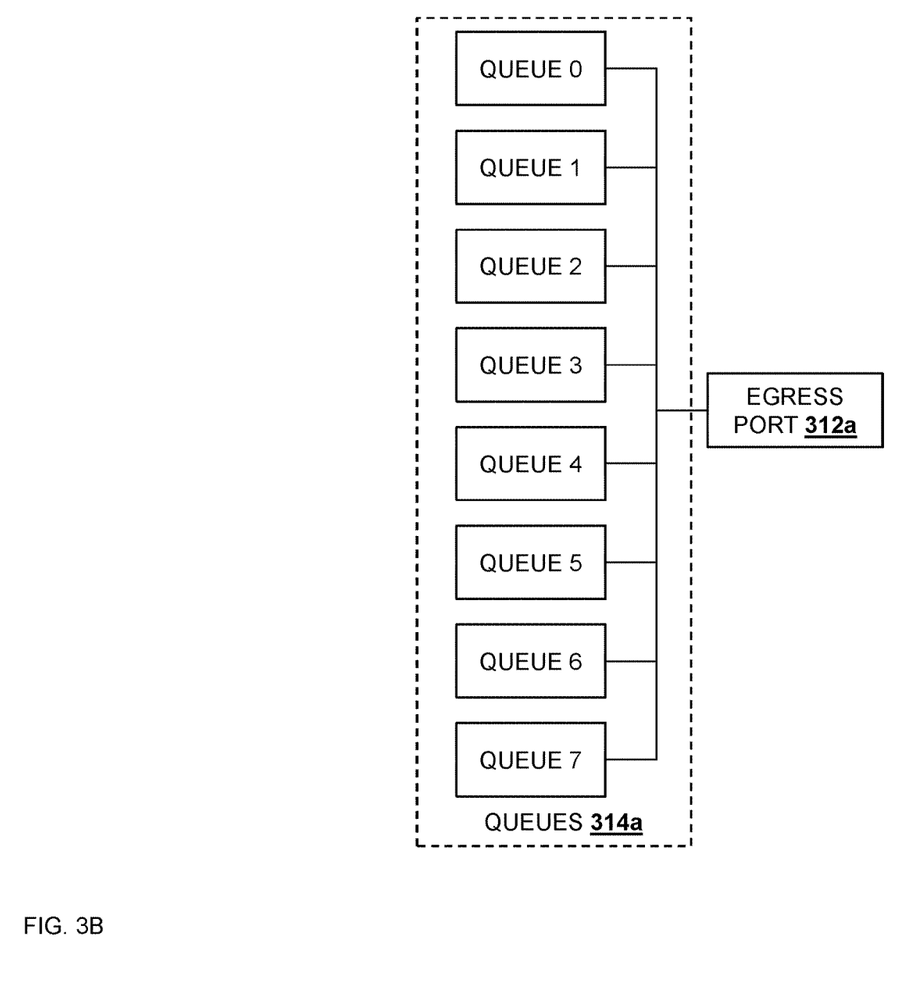
FIG. 3B is a schematic view illustrating an embodiment of an egress port and its associated queues provided in the networking device of FIG. 3A.

Referring now to FIGS. 3A and 3B, an embodiment of a networking device 300 is illustrated that may provide any or all of the networking devices 202 discussed above with reference to FIG. 2. As such, the networking device 300 may be provided by the IHS 100 discussed above with reference to FIG. 1, and/or may include some or all of the components of the IHS 100, and in specific examples may be provided by a switch device, although one of skill in art in possession of the present disclosure will recognize that router device(s) and/or other networking devices (as well as any other device utilizing port groups and data packet queuing) will benefit from the teachings of the present disclosure and thus are envisioned as falling within its scope as well. In the illustrated embodiment, the networking device 300 includes a chassis 302 that houses the components of the networking device 300, only some of which are illustrated in FIG. 3. For example, in the illustrated embodiment, the chassis 302 houses a Network Processing Unit (NPU) 304 such as, for example, an NPU provided by BROADCOM® Inc. of San Jose, Cal., United States. In the illustrated embodiment, the NPU 304 (or some other processing system included in the networking device 300) may include or be coupled to a memory system (not illustrated, but which may include the memory 114 discussed above with reference to FIG. 1) that includes instructions that when executed by the NPU 304, cause the NPU 304 to provide a packet processing engine 306 that is configured to perform the functionality of the packet processing engines, NPUs, and networking devices discussed below.

In the illustrated embodiment, the NPU 304 (or some other processing system included in the networking device 300) may include or be coupled to a storage system (not illustrated, but which may include the storage device 108 discussed above with reference to FIG. 1) that includes packet processing table(s) 308 that are configured to store any of the information utilized by the packet processing engines, NPUs, and networking devices discussed below. In a specific example, the packet processing table(s) 308 may be provided by hardware table(s) included in the NPU 304, although other storage devices/techniques are envisioned as falling within the scope of the present disclosure as well. In the illustrated embodiment, the chassis 302 includes a plurality of ingress ports 310a, 310b, 310c, and up to 310d, each of which are coupled to the packet processing engine 306 (e.g., via a bus or other coupling to the NPU 304.) In the illustrated embodiment, the chassis 302 also includes a plurality of egress ports 312a, 312b, 312c, and up to 312d, each of which are coupled to the packet processing engine 306 (e.g., via a bus or other coupling to the NPU 304.)

FIG. 3A illustrates how the packet processing engine 306 in the NPU 304 is configured to provide one or more queues for each of the egress ports 312a-d. For example, in the illustrated embodiment, a plurality of queues 314a are provided for the egress port 312a, a plurality of queues 314b are provided for the egress port 312b, a plurality of queues 314c are provided for the egress port 312c, and a plurality of queues 314d are provided for the egress port 312d. In some of the specific examples discussed below, each of the egress ports 312a-d are provided eight queues, although the provisioning of any number of queues for each of the egress ports 312a-d is envisioned as falling within the scope of the present disclosure as well. For example, FIG. 3B illustrates how the egress port 312a includes queue0, queue1, queue2, queue3, queue4, queue5, queue6, and queue7 as port of the queue 314a, and one of skill in the art in possession of the present disclosure will recognize that each egress port 312b-d may include similar queues as well. While a specific example of a networking device 300 has been illustrated and described, one of skill in the art in possession of the present disclosure will recognize that networking devices may include a variety of components and/or component configurations for providing conventional networking device functionality, as well as the functionality discussed below, while remaining within the scope of the present disclosure as well.

Figure 4:
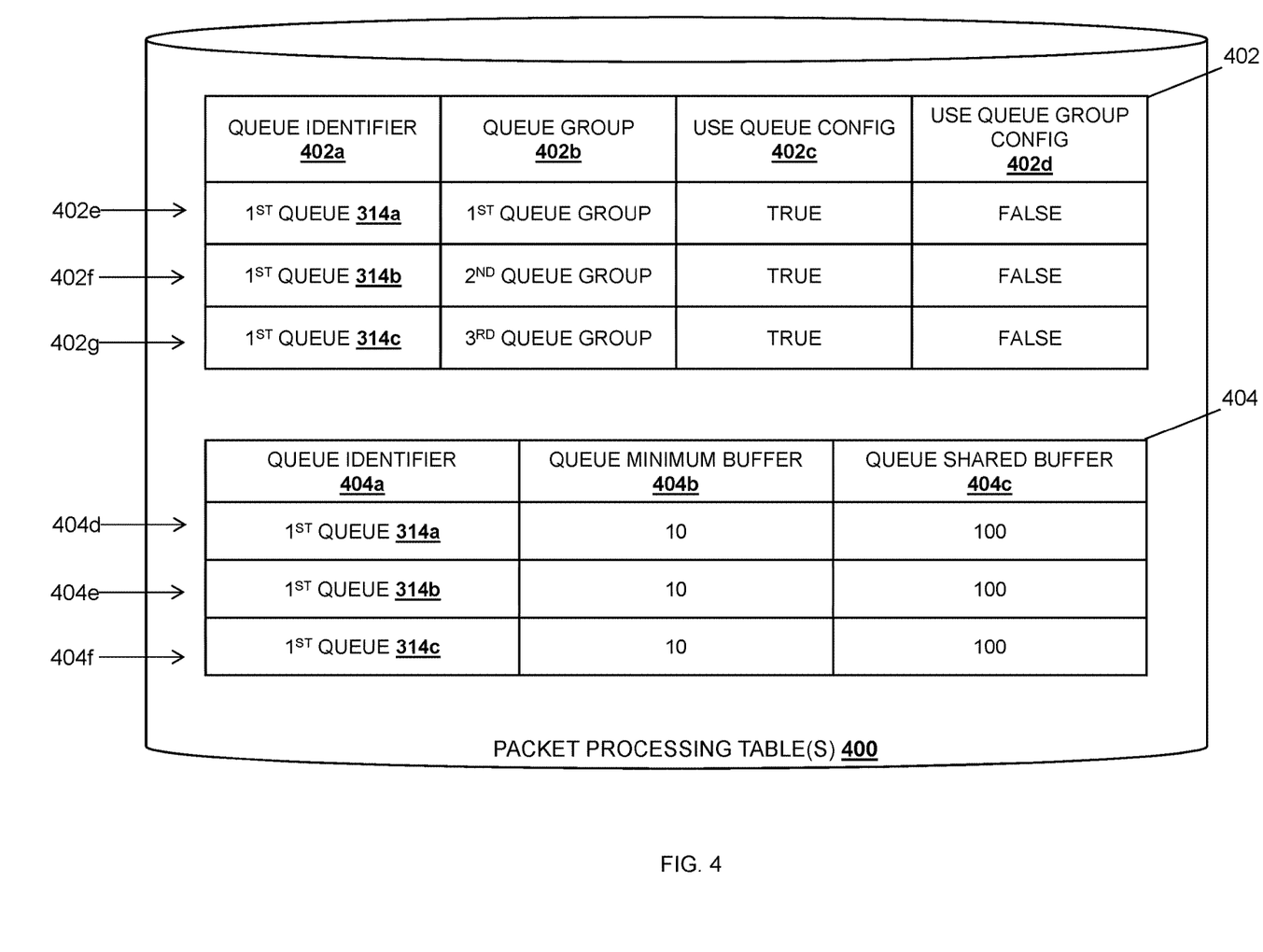
FIG. 4 is a schematic view illustrating an embodiment of packet processing table(s) that may be provided in the networking device of FIG. 3.

Referring now to FIG. 4, an embodiment of packet processing table(s) 400 are illustrated that may provide the packet processing table(s) 308 discussed above with reference to FIG. 2. As such, the packet processing table(s) 400 may be included in an NPU (e.g., provided by hardware table(s) included in the NPU), provided on a storage device such as the storage device 108 discussed above with reference to FIG. 1, etc. In the illustrated embodiment, the packet processing table(s) 400 include a buffer configuration table 402 that includes a queue identifier column 402a that identifies a particular queue provided by the NPU 304, a queue group column 402b that identifies a queue group to which an associated queue belongs, a use queue configuration column 402c that identifies whether a queue configuration of the associated queue is being used, and a use queue group configuration column 402d that identifies whether a queue group configuration of an associated queue group is being used. As such, in the illustrated embodiment, a first row 402e of the buffer configuration table 402 identifies a $1^{st}$ queue 314a (e.g., a particular queue included in the queues 314a provided for the egress port 312a) in the queue identifier column 402a, identifies a $1^{st}$ queue group associated with the $1^{st}$ queue 314a in the queue group column 402b, identifies that the queue configuration for the $1^{st}$ queue 314a is being used (i.e., "TRUE") in the use queue configuration column 402c, and identifies that the queue group configuration for the $1^{st}$ queue group is not being used (i.e., "FALSE") in the use queue group configuration column 402d.

Similarly, a second row 402f of the buffer configuration table 402 identifies a $1^{st}$ queue 314b (e.g., a particular queue included in the queues 314b provided for the egress port 312b) in the queue identifier column 402a, identifies a $2^{nd}$ queue group associated with the $1^{st}$ queue 314b in the queue group column 402b, identifies that the queue configuration for the $1^{st}$ queue 314b is being used (i.e., "TRUE") in the use queue configuration column 402c, and identifies that the queue group configuration for the $2^{nd}$ queue group is not being used (i.e., "FALSE") in the use queue group configuration column 402d. Similarly, a third row 402g of the buffer configuration table 402 identifies a $1^{st}$ queue 314c (e.g., a particular queue included in the queues 314c provided for the egress port 312c) in the queue identifier column 402a, identifies a $3^{rd}$ queue group associated with the $1^{st}$ queue 314c in the queue group column 402b, identifies that the queue configuration for the $1^{st}$ queue 314c is being used (i.e., "TRUE") in the use queue configuration column 402c, and identifies that the queue group configuration for the $3^{rd}$ queue group is not being used (i.e., "FALSE") in the use queue group configuration column 402d. As will be understood by one of skill in the art in possession of the present disclosure, the queue groups identified in the queue group column 402b may be configured to group a plurality of queues that have been provided for a single port (e.g., each of the queues 314a provided for the egress port 312a may be part of the $1^{st}$ queue group, each of the queues 314b provided for the egress port 312b may be part of the $2^{nd}$ queue group, each of the queues 314c provided for the egress port 312c may be part of the $3^{rd}$ queue group, and so on), and the buffer configuration table 402 illustrated in FIG. 4 includes buffer configuration information that may be provided for the egress ports 312a-d when they are not part of an egress port group according to the teachings of the present disclosure.

In the illustrated embodiment, the packet processing table(s) 400 also includes a buffer configuration table 404 that includes a queue identifier column 404a that identifies a particular queue provided by the NPU 304, a queue minimum buffer size configuration column 404b that identifies a guaranteed queue minimum buffer size of an associated queue, and a queue shared buffer size configuration column 404c that identifies a maximum shared buffer that the queue may utilize form the available global buffer pool. As such, in the illustrated embodiment, a first row 404d of the buffer configuration table 404 identifies the $1^{st}$ queue 314a (e.g., a particular queue included in the queues 314a provided for the egress port 312a) in the queue identifier column 404a, identifies a queue minimum buffer size (e.g., 10) associated with the $1^{st}$ queue 314a in the queue minimum buffer size configuration column 404b, and identifies a queue shared buffer size (e.g., 100) associated with the $1^{st}$ queue 314a in the queue shared buffer size configuration column 404c. As will be understood by one of skill in the art in possession of the present disclosure, the amount provided for the queue minimum buffer size and queue shared buffer size (e.g., 10 and 100 in the example above) may represent cells that may each provide a bytes of information storage. For example, some platforms provide cell sizes of 208 bytes.

Similarly, in the illustrated embodiment, a second row 404e of the buffer configuration table 404 identifies the $1^{st}$ queue 314b (e.g., a particular queue included in the queues 314b provided for the egress port 312b) in the queue identifier column 404a, identifies a queue minimum buffer size (e.g., 10) associated with the $1^{st}$ queue 314b in the queue minimum buffer size configuration column 404b, and identifies a queue shared buffer size (e.g., 100) associated with the $1^{st}$ queue 314b in the queue shared buffer size configuration column 404c. Similarly, in the illustrated embodiment, a third row 404f of the buffer configuration table 404 identifies the $1^{st}$ queue 314c (e.g., a particular queue included in the queues 314c provided for the egress port 312c) in the queue identifier column 404a, identifies a queue minimum buffer size (e.g., 10) associated with the $1^{st}$ queue 314c in the queue minimum buffer size configuration column 404b, and identifies a queue shared buffer size (e.g., 100) associated with the $1^{st}$ queue 314c in the queue shared buffer size configuration column 404c. As will be understood by one of skill in the art in possession of the present disclosure, the buffer configuration table 404 illustrated in FIG. 4 includes buffer configuration information that provides the respective queue configurations utilized for each of the $1^{st}$ queue 314a, the $1^{st}$ queue 314b, and the $1^{st}$ queue 314c when the use queue configuration column 402c indicates that the queue configuration for each of those queues is being used (e.g., "TRUE", as illustrated in FIG. 4).

Figure 5:
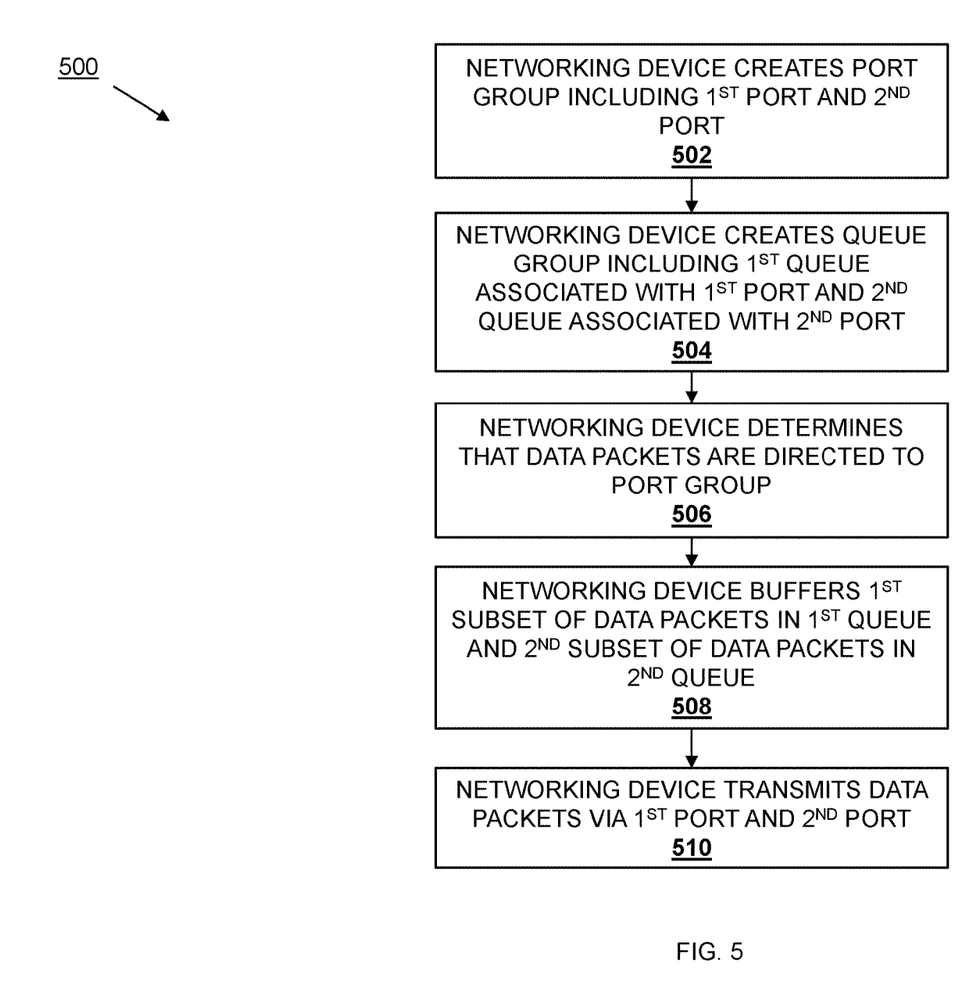
FIG. 5 is a flow chart illustrating an embodiment of a method for providing a queue group for multiple ports.

Referring now to FIG. 5, an embodiment of a method 500 for providing a queue group for multiple ports is illustrated. As discussed below, the systems and methods of the present disclosure provide for the grouping of queues associated with different ports in a port group in order to allow a shared buffer for data packets directed to that port group. For example, egress ports on a networking device may each be associated with a respective set of queues, and each of these queues provided for any particular egress port may belong to a queue group (e.g., each set of queues associated with a particular egress port may belong to the same queue group). The queues and queue group associated with any particular egress port may also be associated with buffer configurations (e.g., a queue minimum buffer size configuration, a queue shared buffer size configuration, etc.) that are applied on a per-queue, per-port basis, with the individual queue buffer configuration for each queue enabled and the queue group buffer configuration disabled. When those egress ports are configured in an egress port group (e.g., a LAG or ECMP group), queues associated with different egress ports may be selected for queue group(s) (e.g., queues that belong to the different egress ports but that have similar priority mappings may be selected for any particular queue group).

For example, if the egress port group includes three egress ports that are each provided with eight queues (e.g., as illustrated in FIG. 3B), then eight queue groups may be created that each include the same queue number associated with each of the three egress ports. The buffer configuration of the queue group(s) may be configured with an aggregated value of the buffer configurations of the individual queues included in those queue group(s). For example, if each of the three queues in a particular queue group include a queue minimum buffer size configuration of 10 and a queue shared buffer size configuration of 100, that queue group including those three queues may have a queue minimum buffer size configuration of 30, and a queue shared buffer size configuration of 300. Following the creation of the queue group(s), each queue in the queue group is configured to buffer data packets according to the buffer configuration of the queue group rather than the buffer configuration of any of the individual queues included therein. Furthermore, even if one of the egress ports in an egress port group becomes unavailable to transmit data packets, the use of the buffer associated with that queue in the egress port may continue as part of the shared buffer provided by the queue group without the need for any configuration changes. As such, a multi-port queue group system is provided that enables a shared buffer that utilizes a queue group made up of multiple queues associated with different ports in a port group, providing for more efficient queue/buffer utilization for ports provided in a port group.

The method 500 begins at block 502 where a networking device creates a port group including a first port and a second port. In an embodiment, at block 502, the packet processing engine 306 in the NPU 304 (or some other engine in the NPU 304) may receive an instruction to create a port group. For example, a user of the networking device 300 may utilize the management device 208 to connect to the networking device 202/300, and provide an instruction to create a port group such as a Link Aggregation Group (LAG), an Equal Cost Multi-path Protocol (ECMP) group, and/or other port groups that would be apparent to one of skill in the art in possession of the present disclosure. As would be understood by one of skill in the art in possession of the present disclosure, ports may be configured in LAGs by combining/aggregating multiple network connections provided by those ports in parallel in order to increase throughput of the network connection provided by those ports beyond what a network connection provided by any one of those ports is capable of, to provide redundancy in the event one or more of those ports becomes unavailable, and/or provide a variety of other benefits LAG benefits known in the art. As would also be understood by one of skill in the art in possession of the present disclosure, ECMP is a routing protocol where next-hop packet forwarding to a destination can occur over multiple 'best paths' that tie for the top spot in a routing metric calculation, and ports may be configured as part of an ECMP group to increase bandwidth via the load balancing of data packets over multiple paths, as well as provide a variety of other ECMP benefits known in the art. However, while a few specific examples of port groups have been described, one of skill in the art in possession of the present disclosure will recognize that a variety of other port groups may benefit from the queue grouping of the present disclosure, as those port groups will fall within the scope of the present disclosure as well.

Figure 6:
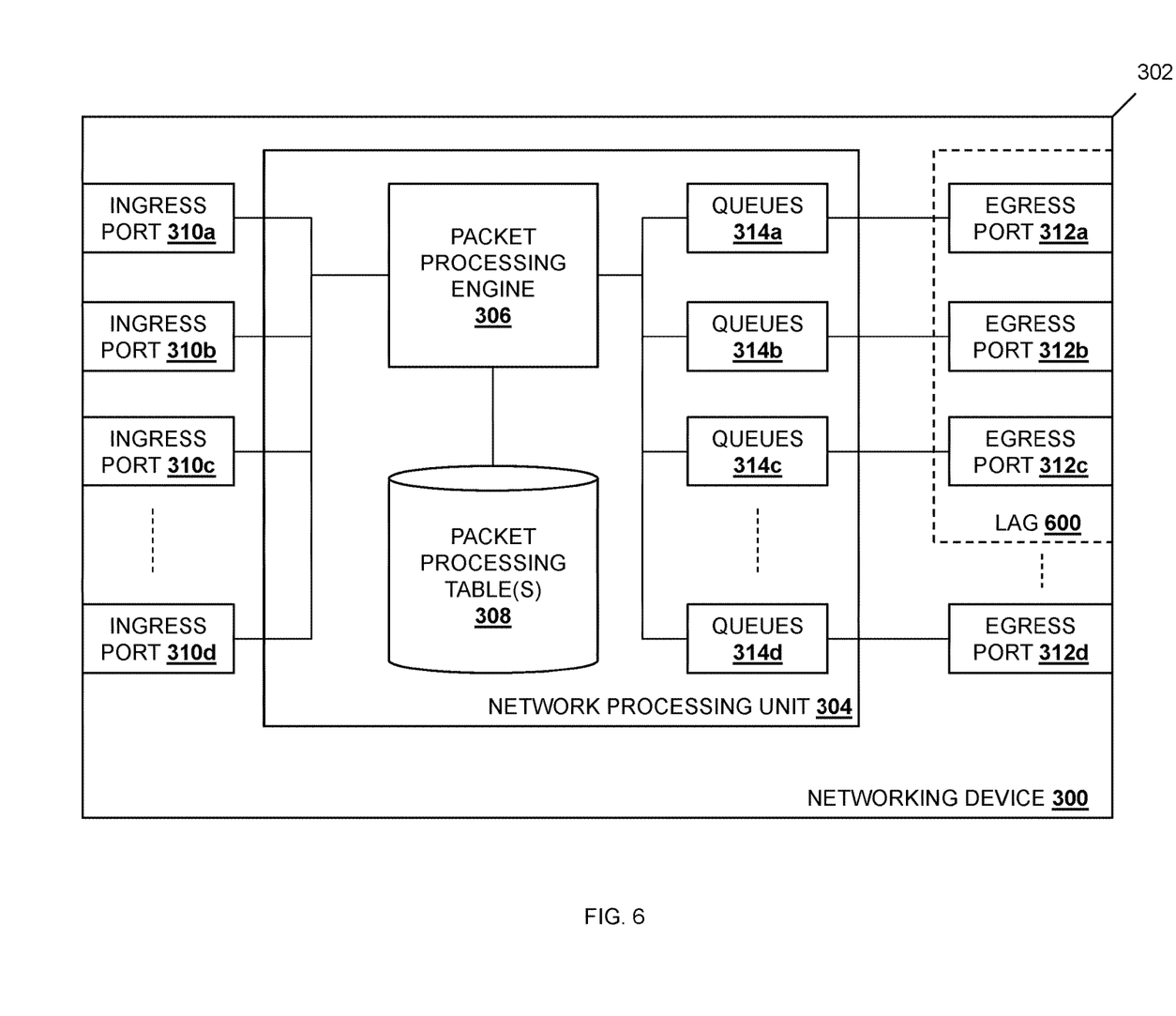
FIG. 6 is a schematic view illustrating an embodiment of the networking device of FIG. 2 with egress ports provided in a Link Aggregation Group (LAG).

With reference to FIG. 6, an embodiment of the networking device 300 is illustrated in which the egress ports 312a, 312b, and 312c have been configured as port of a LAG 600 (i.e., an egress port group). While not described herein in detail, one of skill in the art in possession of the present disclosure will recognize how an instruction to create a LAG using the egress ports 312a-c may be provided by a user (e.g., via the management device 208) to the packet processing engine 306 (or other engine) in the NPU 304, and how the packet processing engine 306 (or other engine) in the NPU 304 may operate to configure the egress ports 312a-c into the LAG 600 illustrated in FIG. 6. Furthermore, one of skill in the art in possession of the present disclosure will also recognize how egress ports (e.g., the egress ports 312a-c) may be configured as part of an ECMP group or other port group utilizing port grouping techniques that are known in the art. As such, following block 502, the egress ports 312a-c are configured as a LAG 600, with each egress port 312a, 312b, and 312c associated with their respective queues 314a, 314b, and 314c that may each have respective buffer configurations similar to those described above in the buffer configuration tables 402 and 404 provided in the packet processing table(s) 400 illustrated in FIG. 4.

The method 500 then proceeds to block 504 where the networking device creates a queue group including a first queue associated with the first port and a second queue associated with the second port. In an embodiment, at block 504, the packet processing engine 306 in the NPU 304 (or some other engine in the NPU 304) may create queue group(s) that include queues that are associated with each of the ports that were configured as part of the port group at block 502. In some embodiments, the queue group(s) may be created at block 504 automatically (e.g., without user intervention or instruction) during or in response to the creation of the port group at block 502. In other embodiments, the queue group(s) may be created at block 504 in response to at least some user intervention or instruction during or following the creation of the port group at block 502. For example, during or after the process of creating the port group at block 502, the user of the networking device 300 may be provided (e.g., on a display device included in the management device 208) a queue grouping user interface that allows the user to instruct the creation of the queue group(s) at block 504. In other examples, the user of the networking device 300 may provide instructions to create the queue group(s) at block 504 along with the instructions to create the port group at block 502. However, while a few specific examples have been described, the creation of the queue group(s) at block 504 may occur in a variety of automated and/or user-instructed manners that will fall within the scope of the present disclosure as well.

Figure 7:
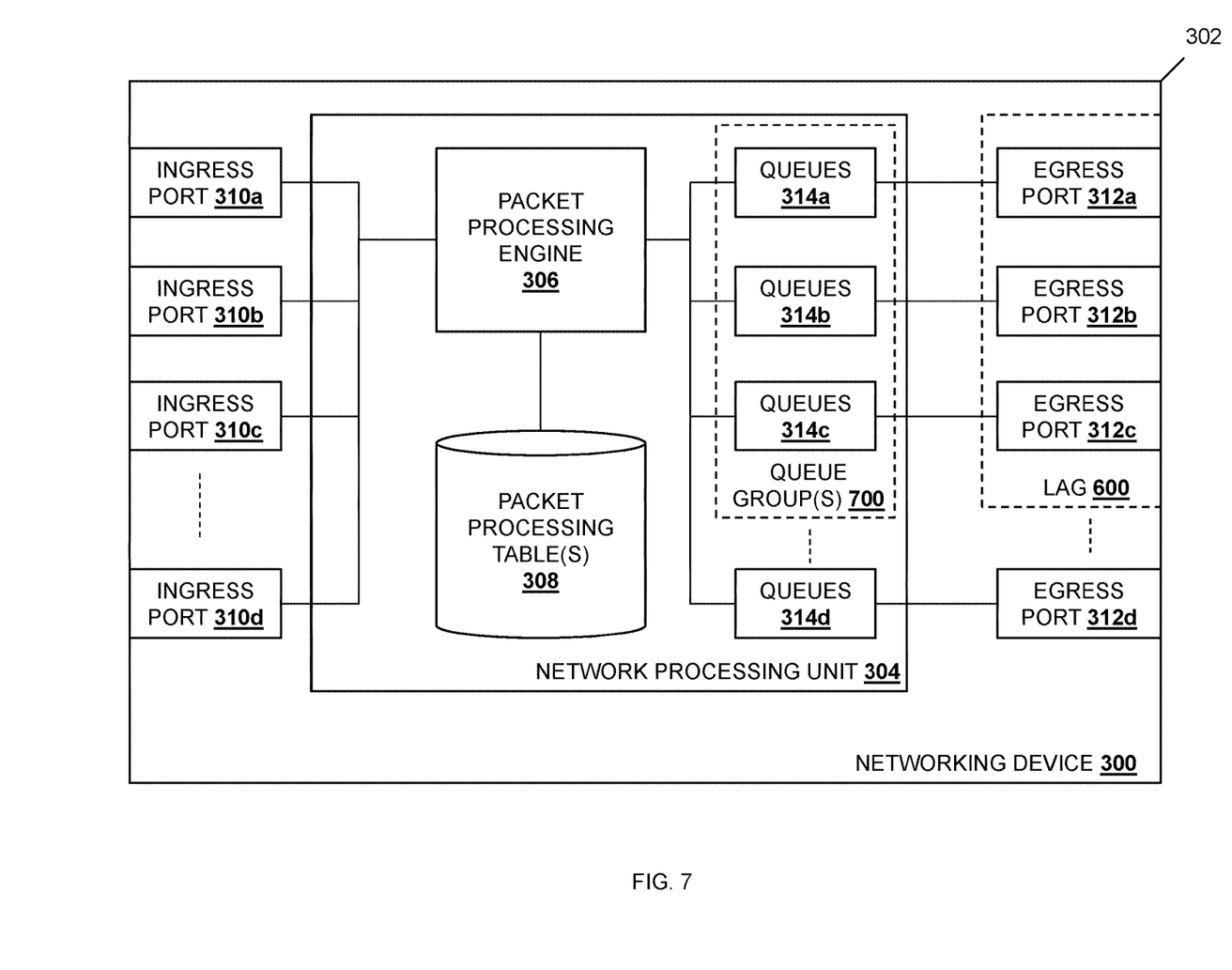
FIG. 7 is a schematic view illustrating an embodiment of the networking device of FIG. 6 with a queue group provided for the egress ports in the LAG.
Figure 8:
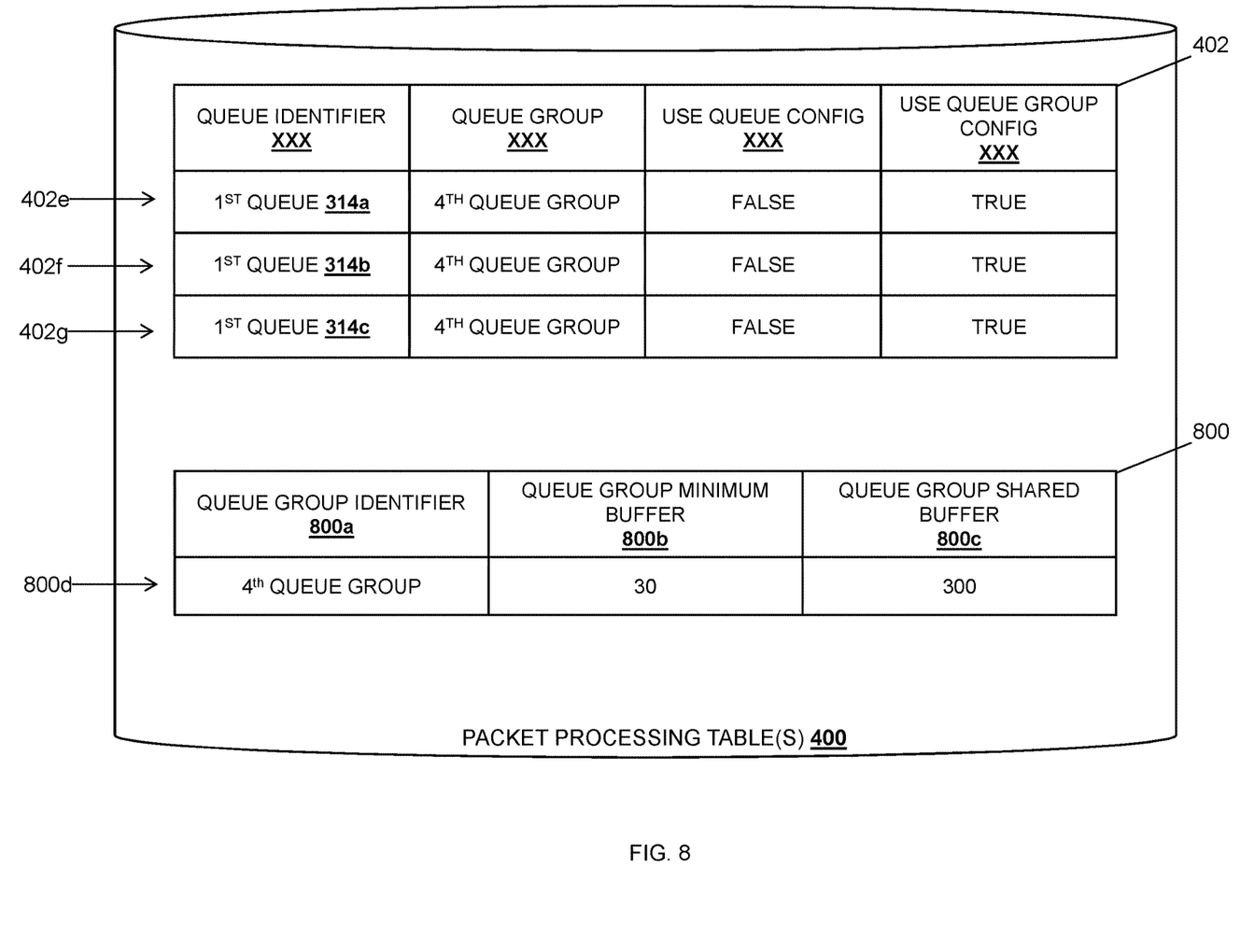
FIG. 8 is a schematic view illustrating an embodiment of the packet processing table(s) of FIG. 5 provided for the queue group of FIG. 7.

Referring now to FIG. 7, an embodiment of the networking device 300 is illustrated with queue group(s) 700 that includes the queues 314a, 314b, and 314c that are associated with the respective egress ports 312a, 312b, and 312c that were configured as part of the LAG 600 at block 502. With reference to FIGS. 7 and 8, an embodiment of the packet processing table(s) 308/400 is illustrated that includes the buffer configuration table 402 that has been modified to provide one of the queue group(s) 700, as well as a buffer configuration table 800 that provides a buffer configuration for that one of the queue group(s) 700. As can be seen, in the illustrated embodiment, a first row 402e of the buffer configuration table 402 still identifies the 1$^{st}$ queue 314a (e.g., a particular queue included in the queues 314a provided for the egress port 312a) in the queue identifier column 402a, but now identifies a 4$^{th}$ queue group (i.e., a particular one of the queue group(s) 700) associated with the 1$^{st}$ queue 314a in the queue group column 402b, identifies that the queue configuration for the 1$^{st}$ queue 314a is not being used (i.e., "FALSE") in the use queue configuration column 402c, and identifies that the queue group configuration for the 4$^{th}$ queue group is being used (i.e., "TRUE") in the use queue group configuration column 402d.

Similarly, a second row 402f of the buffer configuration table 402 still identifies the 1$^{st}$ queue 314b (e.g., a particular queue included in the queues 314b provided for the egress port 312b) in the queue identifier column 402a, but now identifies the 4$^{th}$ queue group (i.e., the particular one of the queue group(s) 700) associated with the 1$^{st}$ queue 314b in the queue group column 402b, identifies that the queue configuration for the 1$^{st}$ queue 314b is not being used (i.e., "FALSE") in the use queue configuration column 402c, and identifies that the queue group configuration for the 4$^{th}$ queue group is being used (i.e., "TRUE") in the use queue group configuration column 402d. Similarly, a third row 402g of the buffer configuration table 402 still identifies the 1$^{st}$ queue 314c (e.g., a particular queue included in the queues 314c provided for the egress port 312c) in the queue identifier column 402a, but now identifies the 4$^{th}$ queue group (i.e., a particular one of the queue group(s) 700) associated with the 1$^{st}$ queue 314c in the queue group column 402b, identifies that the queue configuration for the 1$^{st}$ queue 314c is not being used (i.e., "FALSE") in the use queue configuration column 402c, and identifies that the queue group configuration for the 4$^{th}$ queue group is being used (i.e., "TRUE") in the use queue group configuration column 402d.

In the illustrated embodiment, the packet processing table(s) 400 also includes the buffer configuration table 800 that includes a queue group identifier column 800a that identifies a particular queue group provided by the NPU 304, a queue group minimum buffer configuration column 800b that identifies a queue group minimum buffer size of an associated queue group, and a queue group shared buffer size configuration column 800c that identifies queue group shared buffer size of the associated queue group. As such, in the illustrated embodiment, a first row 800d of the buffer configuration table 800 identifies the 4$^{th}$ queue group (e.g., a particular one of the queue group(s) 700 that includes the 1$^{st}$ queue 314a, the 1$^{st}$ queue 314b, and the 1$^{st}$ queue 314c) in the queue group identifier column 800a, identifies a queue group minimum buffer size (e.g., 30, which in this example is an aggregation of the queue minimum buffer sizes of the 1$^{st}$ queue 314a, the 1$^{st}$ queue 314b, and the 1$^{st}$ queue 314c illustrated in FIG. 4) associated with the 4$^{th}$ queue group in the queue group minimum buffer size configuration column 800b, and identifies a queue group shared buffer size (e.g., 100, which in this example is an aggregation of the queue group shared buffer sizes of the 1$^{st}$ queue 314a, the 1$^{st}$ queue 314b, and the 1$^{st}$ queue 314c illustrated in FIG. 4) for the 4$^{th}$ queue group in the queue group shared buffer size configuration column 800c.

While only a single queue group (i.e., the 4$^{th}$ queue group that provides one of the queue group(s) 700 illustrated in FIG. 7) is illustrated, as discussed above several queue groups may be created and defined by the buffer configuration information in the buffer configuration tables. For example, each of the egress ports 312a-c may be provided eight queues and, as such, a 5$^{th}$ queue group may be made up of a 2$^{nd}$ queue 314a (i.e., one of the queues 314a associated with the egress port 312a), a 2$^{nd}$ queue 314b (i.e., one of the queues 314b associated with the egress port 312b), and a 2$^{nd}$ queue 314c (i.e., one of the queues 314c associated with the egress port 312c); a 6$^{th}$ queue group may be made up of a 3$^{rd}$ queue 314a (i.e., one of the queues 314a associated with the egress port 312a), a 3$^{rd}$ queue 314b (i.e., one of the queues 314b associated with the egress port 312b), and a 3$^{rd}$ queue 314c (i.e., one of the queues 314c associated with the egress port 312c); and up to an a 11$^{th}$ queue group may be made up of a 8$^{th}$ queue 314a (i.e., one of the queues 314a associated with the egress port 312a), a 8$^{th}$ queue 314b (i.e., one of the queues 314b associated with the egress port 312b), and a 8$^{th}$ queue 314c (i.e., one of the queues 314c associated with the egress port 312c). As such, with reference to the specific example illustrated in FIG. 3B, information provided in the packet processing tables may configure the respective queue0 that is provided for each of the egress ports 312a-c as part of a first queue group, the respective queue1 that is provided for each of the egress ports 312a-c as part of a second queue group, the respective queue3 that is provided for each of the egress ports 312a-c as part of a third queue group, and so on.

As such, the 5$^{th}$ queue group may have its queue group minimum buffer size and queue group shared buffer size (e.g., aggregates of the queue minimum buffer size and queue shared buffer size of the 2$^{nd}$ queue 314a, 2$^{nd}$ queue 314b, and 2$^{nd}$ queue 314c) defined in the buffer configuration table 800 similarly illustrated for the 4$^{th}$ queue group; and up to the 11$^{th}$ queue group may have its queue group minimum buffer size and queue group shared buffer size (e.g., aggregates of the queue minimum buffer size and queue shared buffer size of the 8$^{th}$ queue 314a, 8$^{th}$ queue 314b, and 8$^{th}$ queue 314c) defined in the buffer configuration table 800 similarly illustrated for the 4$^{th}$ queue group; and so. The grouping of queues that are provided for different ports (e.g., the 1$^{st}$ queue 314a, the 1$^{st}$ queue 314b, and the 1$^{st}$ queue 314c included in the 4$^{th}$ queue group in the illustrated embodiment; the 2$^{nd}$ queue 314a, the 2$^{nd}$ queue 314b, and the 2$^{nd}$ queue 314c included in the 5$^{th}$ queue group discussed above; and so on) may be made based on a variety of factors including, for example, based on those queues having similar priority mappings.

As such, the queue groups created at block 504 may be provided using a plurality of queues that are associated with different ports (e.g., a 4$^{th}$ queue group that includes at least one respective queue provided for each of the egress ports 312a, 312b, and 312c, a 5$^{th}$ queue group that includes at least one respective queue provided for each of the egress ports 312a, 312b, and 312c, a 6$^{th}$ queue group that includes at least one respective queue provided for each of the egress ports 312a, 312b, and 312c, and so on), and the buffer configuration tables 402 and 800 illustrated in FIG. 8 include buffer configuration information that may be provided for the egress ports 312a-c when they are part of an egress port group in order to provide queue groups (e.g., the 4$^{th}$ queue group) and enable a buffer configuration that aggregates the buffer configurations of the queues included in those queue group. However, while the queue group(s) of the present disclosure have been discussed as aggregating the buffer configurations of their component queues, queue groups may combine the buffer configurations of their component queues in any of a variety of manners that will fall within the scope of the present disclosure as well.

The method 500 then proceeds to block 506 where the networking device determines that data packets are directed to the port group. In an embodiment, at block 506, the endpoint device 204 may generate and transmit data packets to the endpoint device 206 via the networking device(s) 202. As such, at block 506, the packet processing engine 306 in the NPU 304 may receive those data packets via its ingress port(s) 310a-310d. In response to receiving any of those data packets, the packet processing engine 306 in the NPU 304 may determine that those data packets are directed to the egress port(s) 312a-c in the LAG 600 by, for example, identifying a destination address in the data packet and using packet routing information to determine that a destination associated with that destination address is reachable through that egress port, and/or utilizing a variety of other data packet routing techniques that would be apparent to one of skill in the art in possession of the present disclosure. As will be appreciated by one of skill in the art in possession of the present disclosure, when data packets are received at the ingress ports 310a-d, the NPU 304 will determine which queue those data packets should be directed to based on, for example, any classification configurations that have been applied. Furthermore, when the egress ports 312a-c are part of the LAG 600, the NPU 304 may determine a particular egress port for transmitting those data packets using LAG hashing techniques (as well as the queue determined via the classification configurations discussed above.) As such, a data packet that is directed to the LAG and the queue3 may be directed to the respective queue3 that is provided for any of the egress ports 312a-312c (i.e., because those egress ports are part of a LAG) based, for example, on the egress port determined via the LAG hashing discussed above, and may utilize the buffer of the queue group including the queue3's provided for each respective egress port 312a-312c. Furthermore, in the event an egress port in the LAG becomes unavailable, the LAG hashing techniques may ensure that that egress port is not selected for further data packets received at the ingress ports.

The method 500 then proceeds to block 508 where the networking device buffers a first subset of the data packets in the first queue and a second subset of the data packets in the second queue. In an embodiment, at block 508, the packet processing engine 306 in the NPU 304 may operate to buffer the data packets that are directed to the LAG 600 in different queues included in one of the queue group(s) 700. For example, with reference to the $4^{th}$ queue group (i.e., one of the queue group(s) 700 including the $1^{st}$ queue 314a, the $1^{st}$ queue 314b, and the $1^{st}$ queue 314c) illustrated in FIG. 8, the packet processing engine 306 in the NPU 304 may buffer a $1^{st}$ subset of the data packets in the $1^{st}$ queue 314a included in the $4^{th}$ queue group, the packet processing engine 306 in the NPU 304 may buffer a $2^{nd}$ subset of the data packets in the $1^{st}$ queue 314b included in the $4^{th}$ queue group, and the packet processing engine 306 in the NPU 304 may buffer a $3^{rd}$ subset of the data packets in the $1^{st}$ queue 314c included in the $4^{th}$ queue group. As such, data packets directed to the LAG 600 (or any port group for which a queue group has been provided) may be buffered or otherwise stored in different queues that are associated with different ports but provided as part of the same queue group. While the buffering of data packets in different queues in one queue group has been described, one of skill in the art in possession of the present disclosure will recognize that data packets may be buffered in different queues included in other queue groups (e.g., the $5^{th}$ queue group and up to the $11^{th}$ queue group discussed above) in a similar manner while remaining within the scope of the present disclosure as well.

Furthermore, in the event that one of the egress ports 312a-c (e.g., the egress port 312c) in the LAG 600 becomes unavailable (e.g., for transmitting data packets), the buffer(s) (e.g., the queues 314c) provided for that egress port will remain available, and thus data packets may be buffered in those buffer(s) (as part of their respective queue group) regardless of the availability of their associated egress ports. As would be understood by one of skill in the art in possession of the present disclosure, queues may be fixed to an egress port (e.g., the egress port and queues in a LAG may be determined at the ingress stage itself.) As such, if an egress port in a LAG becomes unavailable, the buffers allocated to the queue provided for that port may be utilized as part of the queue group. For example, if the egress ports 312a-c are part of LAG 600 and queue1 provided for each of those egress ports 312a-c provide a queue group that combines the buffers for each queue1, if a link provided by the egress port 312a becomes unavailable, the ingress logic in the NPU 304 may provide data packets through respective queue1 provided for the egress ports 312b and 312c, but the buffers are based on the queue group so queue1 provided for egress port 312a is still available.

Furthermore, the buffering of the data packets in the queues (e.g., the $1^{st}$ queue 314a, the $1^{st}$ queue 314b, and the $1^{st}$ queue 314c) included in a queue group (e.g., the $4^{th}$ queue group) is subject to the buffer configurations of the queue group (e.g., the queue group minimum buffer size of 30 and the queue group shared buffer size of 300 in FIG. 8) rather than the buffer configurations of the individual queues included therein (e.g., the queue minimum buffer sizes of 10 and the queue shared buffer sizes of 100 for each of the $1^{st}$ queue 314a, the $1^{st}$ queue 314b, and the $1^{st}$ queue 314c in FIG. 4). In other words, the creation of a queue group (e.g., the $4^{th}$ queue group) by the packet processing engine 306 in the NPU 304 reprograms its corresponding queues (e.g., the $1^{st}$ queue 314a, the $1^{st}$ queue 314b, and the $1^{st}$ queue 314c) to use the queue group buffer configuration rather than their individual queue configurations.

The method 500 then proceeds to block 510 where the networking device transmits the data packets via the first port and the second port. In an embodiment, at block 510 and following the buffering of at least some of the data packets in the queues included in the queue group, the packet processing engine 306 in the NPU 304 operates to transmit the data packets that were buffered in the queues included in the queue group via at least one of the egress ports 312a-c included in the LAG. While not described in detail herein, one of skill in the art in possession of the present disclosure will recognize how data packets that have been buffered in a queue may be transmitted via an egress port Thus, systems and methods have been described that provide for the grouping of queues associated with different ports in a port group in order to provide a shared buffer for data packets directed to that port group. For example, ports on a networking device may be configured in a port group (e.g., a LAG, ECMP group, or other port group), and queues associated with different ports may be selected (e.g., queues that belong to the different ports but having similar priority mappings) for queue group(s) for ports in the port group. Furthermore, buffer configurations of the queue group(s) may be configured with an aggregated value of the buffer configurations of the individual queues included in those queue group(s), and following the creation of the queue group(s), each queue group is configured to buffer data packets according to the buffer configuration of the queue group rather than the buffer configuration of any of the individual queues included therein. Further still, even if one of the ports in a port group becomes unavailable to transmit data packets, the use of the buffer associated with that port may continue as part of the shared buffer provided by the queue group without the need for any configuration changes. As such, a multi-port queue group system is provided that enables a shared buffer that utilizes a queue group made up of multiple queues associated with different ports in a port group, providing for more efficient queue/buffer utilization for ports provided in a port group.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-port queue group system, comprising:
at least one ingress port;
an egress port group including:
  a first egress port; and
  a second egress port that is aggregated with the first egress port to provide the egress port group; and
a Network Processing Unit (NPU) that is coupled to the at least one ingress port and each of the first egress port and the second egress port, wherein the NPU includes:
  an egress queue group including:
    a first egress queue that is associated with the first egress port and a first egress queue buffer configuration; and
    a second egress queue that is associated with the second egress port and a second egress queue buffer configuration,
    wherein the first egress queue is aggregated with the second egress queue to provide the egress queue group in response to the first egress port that is associated with the first egress queue being aggregated with the second egress port that is associated with the second egress queue to provide the egress port group,
    wherein the egress queue group is associated with an egress queue group buffer configuration that includes an aggregation of the first egress queue buffer configuration and the second egress queue buffer configuration and that controls the buffering of a plurality of data packets in the first egress queue and the second egress queue, and
    wherein the egress queue group buffer configuration includes an egress queue group buffer configuration value that is an aggregated value of a first egress queue buffer configuration value that is included in the first egress queue buffer configuration and a second egress queue buffer configuration value that is included in the second egress queue buffer configuration; and
  a packet processing engine that is configured to:
    receive, via the at least one ingress port, a plurality of data packets;
    determine that each of the plurality of data packets are directed to the egress port group based on a destination identifier included in each of the plurality of data packets that indicates that both the first egress port and the second egress port are configured to provide each of the plurality of data packets to a destination associated with the destination identifier;
    buffer, based on the egress queue group buffer configuration, a first subset of the plurality of data packets in the first egress queue included in the egress queue group;
    buffer, based on the egress queue group buffer configuration, a second subset of the plurality of data packets in the second egress queue included in the egress queue group; and
    transmit at least one of the plurality of data packets via at least one of the first egress port and the second egress port included in the egress port group to the destination.

2. The system of claim 1, wherein the NPU is configured to:
receive an instruction to create the egress port group and, in response:
  create the egress port group; and
  create the egress queue group.

3. The system of claim 1, wherein the packet processing engine is configured to buffer, when the second egress port is unavailable for transmitting data packets, the second subset of the plurality of data packets in the second egress queue included in the egress queue group.

4. The system of claim 1, wherein the NPU includes:
at least one packet processing table that stores buffer configuration information for the first egress queue, the second egress queue, and the egress queue group.

5. The system of claim 1, wherein the egress port group is one of a Link Aggregation Group (LAG) and an Equal Cost Multi-path Protocol (ECMP) group.

6. An Information Handling System (IHS), comprising:
a processing system; and
a memory system that is coupled to the processing system and that includes instruction that, when executed by the processing system, cause the processing system to perform operations including:
  providing a queue group including:
    a first queue that is associated with a first queue buffer configuration and a first port that is included in a port group; and
    a second queue that is associated with a second queue buffer configuration and a second port that is included in the port group,
    wherein the first port and the second port are aggregated to provide the port group,
    wherein the first queue is aggregated with the second queue to provide the queue group in response to the first port that is associated with the first queue being aggregated with the second port that is associated with the second queue to provide the port group,
    wherein the queue group is associated with a queue group buffer configuration that includes an aggregation of the first queue buffer configuration and the second queue buffer configuration and that controls the buffering of a plurality of data packets in the first queue and the second queue, and
    wherein the egress queue group buffer configuration includes an egress queue group buffer configuration value that is an aggregated value of a first egress queue buffer configuration value that is included in the first egress queue buffer configuration and a second egress queue buffer configuration value that is included in the second egress queue buffer configuration;

receiving a plurality of data packets;

determining that each of the plurality of data packets are directed to the port group based on a destination identifier included in each of the plurality of data packets that indicates that both the first port and the second port are configured to provide each of the plurality of data packets to a destination associated with the destination identifier;

buffering, based on the queue group buffer configuration, a first subset of the plurality of data packets in the first queue included in the queue group;

buffering, based on the queue group buffer configuration, a second subset of the plurality of data packets in the second queue included in the queue group; and transmitting at least one of the plurality of data packets via at least one of the first port and the second port included in the port group to the destination.

7. The IHS of claim 6, wherein the operations include:
receiving an instruction to create the port group and, in response:
creating the port group; and
creating the queue group.

8. The IHS of claim 6, wherein the operations include:
buffering, when the second port is unavailable for transmitting data packets, the second subset of the plurality of data packets in the second queue included in the queue group.

9. The IHS of claim 6, wherein the operations includes:
storing, in at least one packet processing table coupled to the processing system, buffer configuration information for the first queue, the second queue, and the queue group.

10. The IHS of claim 6, wherein egress port group is a Link Aggregation Group (LAG).

11. The IHS of claim 6, wherein egress port group is an Equal Cost Multi-path Protocol (ECMP) group.

12. A method for providing a queue group for multiple ports, comprising:
providing, by a networking device, a queue group including:
a first queue that is associated with a first queue buffer configuration and a first port that is included in a port group; and
a second queue that is associated with a second queue buffer configuration and a second port that is included in the port group,
wherein the first port and the second port are aggregated to provide the port group,
wherein the first queue is aggregated with the second queue to provide the queue group in response to the first port that is associated with the first queue being aggregated with the second port that is associated with the second queue to provide the port group,
wherein the queue group is associated with a queue group buffer configuration that includes an aggregation of the first queue buffer configuration and the second queue buffer configuration and that controls the buffering of a plurality of data packets in the first queue and the second queue, and
wherein the egress queue group buffer configuration includes an egress queue group buffer configuration value that is an aggregated value of a first egress queue buffer configuration value that is included in the first egress queue buffer configuration and a second egress queue buffer configuration value that is included in the second egress queue buffer configuration;

receiving, by the networking device, a plurality of data packets;

determining, by the networking device, that each of the plurality of data packets are directed to the port group based on a destination identifier included in each of the plurality of data packets that indicates that both the first port and the second port are configured to provide each of the plurality of data packets to a destination associated with the destination identifier;

buffering, by the networking device and based on the queue group buffer configuration, a first subset of the plurality of data packets in the first queue included in the queue group;

buffering, by the networking device and based on the queue group buffer configuration, a second subset of the plurality of data packets in the second queue included in the queue group; and transmitting, by the networking device, at least one of the plurality of data packets via at least one of the first port and the second port included in the port group to the destination.

13. The method of claim 12, further comprising:
receiving, by the networking device, an instruction to create the port group and, in response:
creating, by the networking device, the port group; and
creating, by the networking device, the queue group.

14. The method of claim 12, further comprising:
buffering, by the networking device when the second port is unavailable for transmitting data packets, the second subset of the plurality of data packets in the second queue included in the queue group.

15. The method of claim 12, further comprising:
storing, by the networking device in at least one packet processing table included in the networking device, buffer configuration information for the first queue, the second queue, and the queue group.

16. The method of claim 12, wherein the port group is a Link Aggregation Group (LAG).

17. The method of claim 12, wherein the port group is an Equal Cost Multi-path Protocol (ECMP) group.

* * * * *